(12) United States Patent
Gupta et al.

(10) Patent No.: US 10,776,245 B2
(45) Date of Patent: *Sep. 15, 2020

(54) ANALYZING PHYSICAL MACHINE IMPACT ON BUSINESS TRANSACTION PERFORMANCE

(71) Applicant: AppDynamics LLC, San Francisco, CA (US)

(72) Inventors: Amod Gupta, San Francisco, CA (US); Ryan Ericson, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 203 days.

This patent is subject to a terminal disclaimer.

(21) Appl. No.: 15/582,701

(22) Filed: Apr. 30, 2017

(65) Prior Publication Data

US 2018/0081781 A1 Mar. 22, 2018

Related U.S. Application Data

(63) Continuation of application No. 14/530,450, filed on Oct. 31, 2014, now Pat. No. 9,652,357.

(51) Int. Cl.
*G06F 11/00* (2006.01)
*G06F 11/34* (2006.01)

(52) U.S. Cl.
CPC ...... *G06F 11/3495* (2013.01); *G06F 11/3409* (2013.01); *G06F 2201/81* (2013.01); *G06F 2201/87* (2013.01)

(58) Field of Classification Search
CPC ............. G06F 11/3495; G06F 11/3409; G06F 2201/87; G06F 2201/81

USPC ......................................................... 714/47.1
See application file for complete search history.

(56) References Cited

U.S. PATENT DOCUMENTS

| | | | | |
|---|---|---|---|---|
| 8,473,251 B1* | 6/2013 | Noth | ................... | G06F 11/0742 702/183 |
| 8,575,861 B1* | 11/2013 | Gordin | ................... | H05B 47/11 315/307 |
| 9,553,788 B1* | 1/2017 | Callan | ..................... | H04L 43/10 |
| 9,652,357 B2* | 5/2017 | Gupta | ................. | G06F 11/3495 |
| 2004/0153823 A1* | 8/2004 | Ansari | ................ | G06F 11/0715 714/38.14 |
| 2004/0186603 A1* | 9/2004 | Sanford | ............ | G05B 23/0245 700/95 |
| 2005/0273785 A1* | 12/2005 | Kass | ........................ | G06F 9/461 718/100 |
| 2007/0130231 A1* | 6/2007 | Brown | ................ | G06F 11/3409 |

(Continued)

*Primary Examiner* — Yair Leibovich
(74) *Attorney, Agent, or Firm* — Behmke Innovation Group LLC; James M. Behmke; James J. Wong (57) ABSTRACT

Application performance data and machine health are collected by a system. The system correlates the two data types to provide context as to how machine health affects the performance of an application. Performance data for an application, for example an application executing as part of a distributed business transaction, and health data for a machine which hosts the application are collected. The performance data and machine health data may be correlated for a particular period of time. The correlation may then be reported to a user. By viewing the correlation, a user may see when machine health was good and bad, and may identify the effects of the machine health on the performance of an application.

19 Claims, 8 Drawing Sheets

(56) References Cited

U.S. PATENT DOCUMENTS

2008/0230326 A1* 9/2008 Tyni .................... B66B 5/0031
187/393
2010/0138510 A1* 6/2010 Moribayashi ............. G06F 9/50
709/207

* cited by examiner

ANALYZING PHYSICAL MACHINE IMPACT ON BUSINESS TRANSACTION PERFORMANCE

CROSS REFERENCE TO RELATED APPLICATIONS

This application is a continuation of U.S. patent application Ser. No. 14/530,450, titled "ANALYZING PHYSICAL MACHINE IMPACT ON BUSINESS TRANSACTION PERFORMANCE," filed Oct. 31, 2014, the disclosure of which is incorporated herein by reference.

BACKGROUND

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring of application performance has become vital to businesses that rely on web-based applications for services and revenue. Monitoring the performance of an application may include determining how long a particular request takes, the response time of a request, and other application performance monitoring metrics. These metrics provide a decent overview of the performance of an application running on a particular machine.

Many operating systems allow an interface for determining the current CPU usage and memory usage for the particular machine. Though useful, this information is nearly always out of context and is not very useful by itself. There is no means for determining the actual effect of the usage on the performance of software running on the machine.

What is needed is an improved method for informing an administrator of the performance of an application managed by the administrator.

SUMMARY

The present technology determines application performance data and machine health and correlates the two data types to provide context as to how machine health affects the performance of an application. Performance data for an application, for example an application executing as part of a distributed business transaction, and health data for a machine which hosts the application are collected. The performance data and machine health data may be correlated for a particular period of time. The correlation may then be reported to a user. By viewing the correlation, a user may see when machine health was good and bad, and may identify the effects of the machine health on the performance of an application.

An embodiment may include a method for monitoring an application. An agent may monitor the performance of an application forming a portion of a distributed business transaction. The agent may collect application performance data. Machine health data may be collected on the machine hosting the application. The application performance data and machine health data may be reported for a time period.

An embodiment may include a system for monitoring a business transaction. The system may include a processor, a memory and one or more modules stored in memory and executable by the processor. When executed, the one or more modules may monitor by an agent the performance of an application forming a portion of a distributed business transaction, the agent collecting application performance data, collect machine health data on the machine hosting the application, and report the application performance data and machine health data for a time period.

DETAILED DESCRIPTION

The present technology determines application performance data and machine health and correlates the two data types to provide context as to how machine health affects the performance of an application. Performance data for an application, for example an application executing as part of a distributed business transaction, and health data for a machine which hosts the application are collected. The performance data and machine health data may be correlated for a particular period of time. The correlation may then be reported to a user. By viewing the correlation, a user may see when machine health was good and bad, and may identify the effects of the machine health on the performance of an application.

Figure 1:
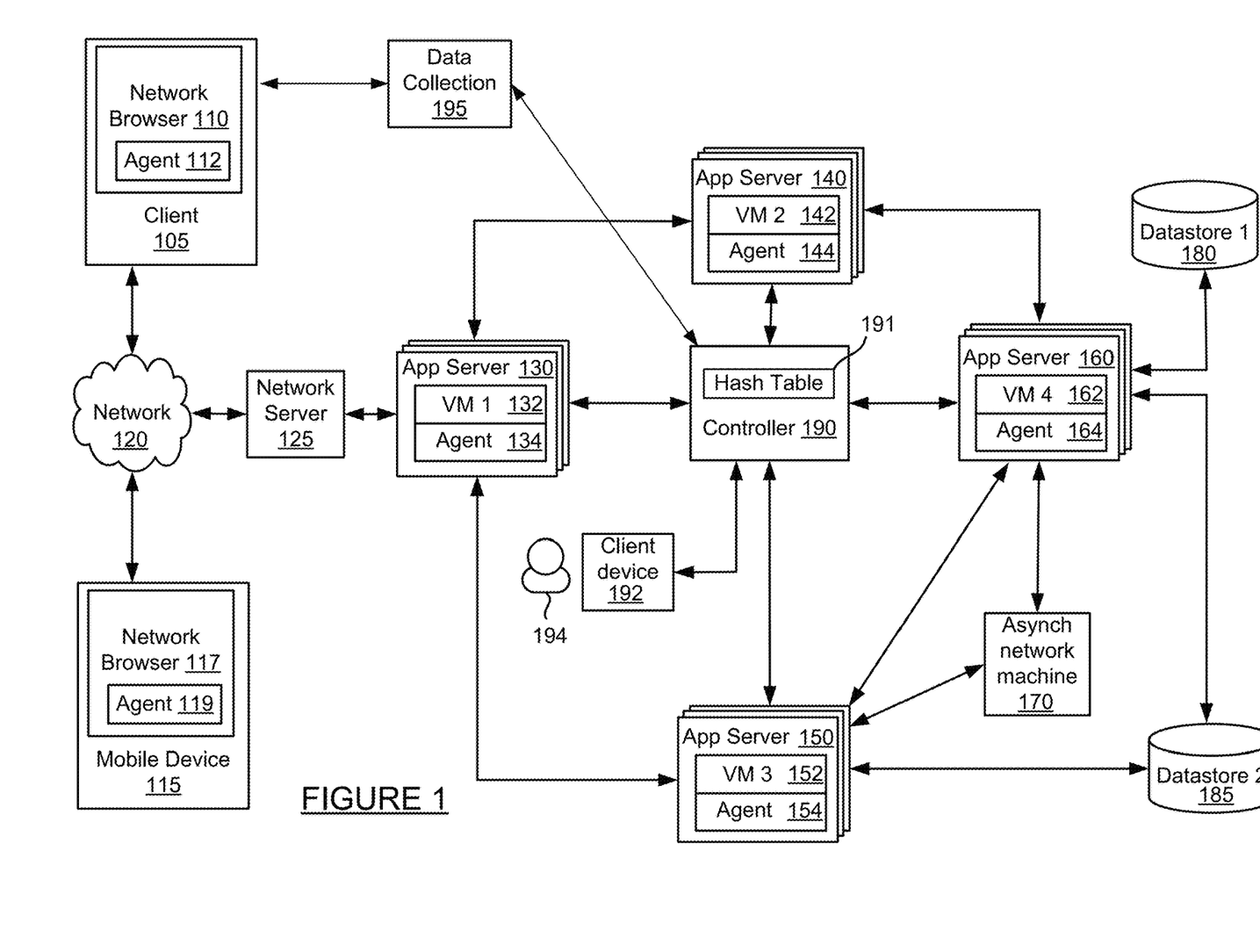
FIG. 1 is a block diagram of a system for correlating application performance data and machine health data.

FIG. 1 is a block diagram of a system for correlating application performance data and machine health data. System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Application servers may or may not include virtual machines. For example, a .NET application server may not include a virtual machine and may be used in place of any application server 130-160 in the system of FIG. 1. References to a virtual machine for each application server are intended to be for exemplary purposes only.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

In embodiments, application server 130 may include software other than virtual machines, such as for example one or more programs and/or modules that processes AJAX requests.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Controller 190 may include hash table 191. The hash table may store reference information for each request in the system of FIG. 1 that includes a count of the number of asynchronous operations currently pending for the request.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
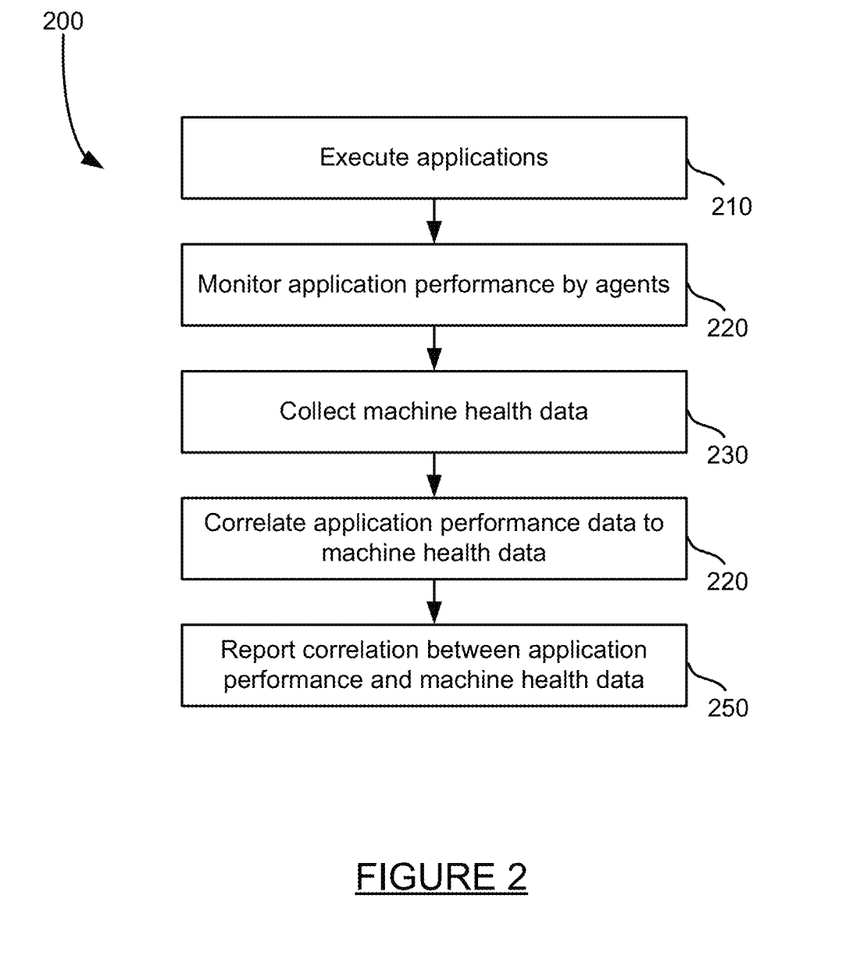
FIG. 2 is a method for correlating performance data and machine health data.

FIG. 2 is a method for correlating application performance data and machine health data. First, one or more applications may be executed at step 210. The applications may be executed on one or more machines which provide a distributed business transaction in response to a request received from a computer. Application performance of the applications is then monitored by one or more agents at step 220. The agents may be installed on one or more machines which host and execute the applications. Each agent may install code into the applications to retrieve information from the applications while the application executes. Each agent may then receive, aggregate, and transmit data to a controller. More details for monitoring an application performance by one or more agents is discussed below with respect to the method of FIG. 3.

Machine health data may be collected at step 230. The machine health data may also be collected by an agent installed on one or more applications on a particular machine. In some instances, an agent may interact with one or more application program interfaces (API) or other interfaces with an operating system through which information for particular machine resources can be retrieved. For example, an agent may retrieve information for machine health through an API to collect data on CPU usage, memory usage, health information for a queue for the machine, and other data. Machine health data may be collected periodically, based on policy rules, or based on other events. Collecting machine health data is discussed in more detail below with respect to the method of FIG. 4.

Application performance data may be correlated to machine health data at step 240 to correlate the two sets of data. A first set of data for a period of time may be retrieved. For example, machine health data for a period of time may be retrieved by an agent. Optionally, the data may be reported to a controller. Application performance data which corresponds to the time period for which the machine health data corresponds may then be retrieved. The correlated data may then be provided to a user and reported at step 250. In particular, a correlation between the application performance data and the machine health data may be reported at step 250. The report may be provided as graphical information, a list of information, a call graph, or other data. Reporting the correlation is discussed in more detail below with respect to the method of FIG. 5.

Figure 3:
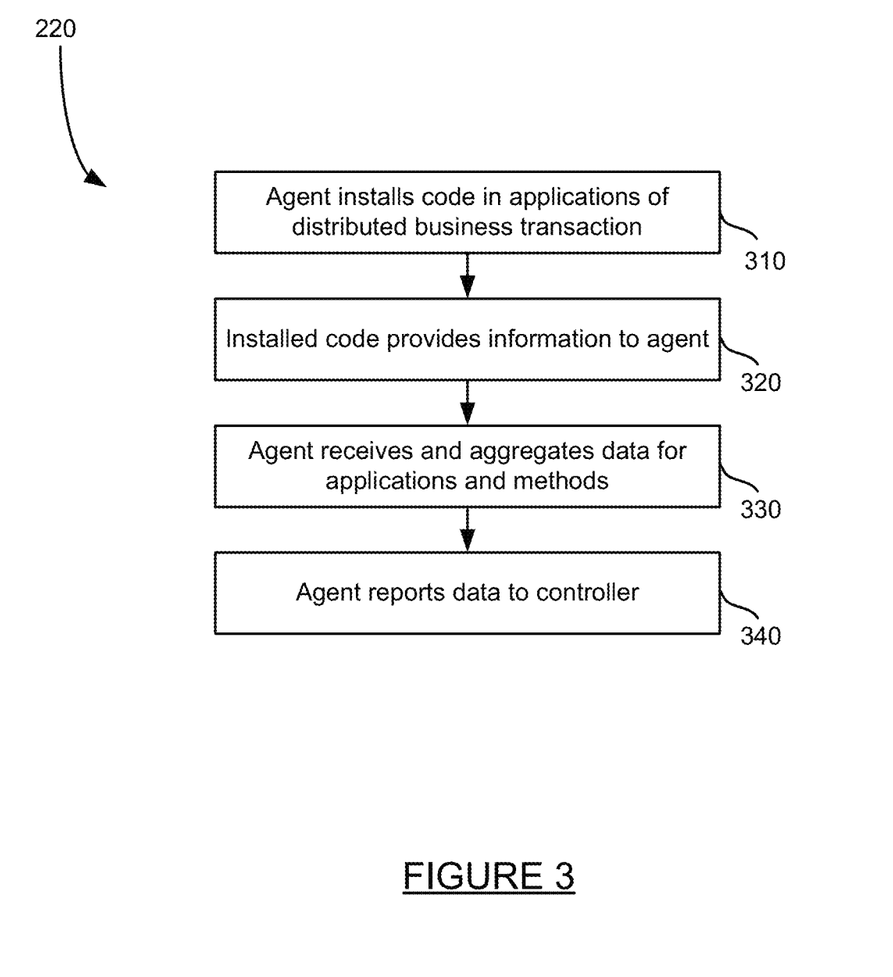
FIG. 3 is a method for monitoring application performance data by an agent.

FIG. 3 is a method for monitoring application performance by an agent. First, an agent installs code in applications of a distributed business transaction at step 310. In some embodiments, one or more agents may be installed to each application, and then the agent may install code or "hooks" into portions of an application it is monitoring. The installed code may provide information to an agent at step 320. For example, the code may report a time that a method is called to the agent. The code may also indicate to the agent when a method returns or completes. Other data that may be provided to a code is call stack information, thread information handling a request, and other data.

The agent may receive and aggregate data for applications and call methods at step 330. The agent may aggregate the data based on an event or periodically. The agent may then report the aggregated data, as well as the individual instance data, to a controller at step 340. The data may be reported to the controller periodically, in response to an event, or in some other manner.

The process of installing an agent into an application, allowing the agent to modify an application, retrieving information by the agent from the installed code, and aggregating and reporting the data may be performed by many agents in many applications on more than one machine. An exemplary description of this process is described in U.S. patent application Ser. No. 12/878,919, titled "Monitoring Distributed Web Application Transactions," filed on Sep. 9, 2010, the disclosure of which is incorporated herein by reference.

Figure 4:
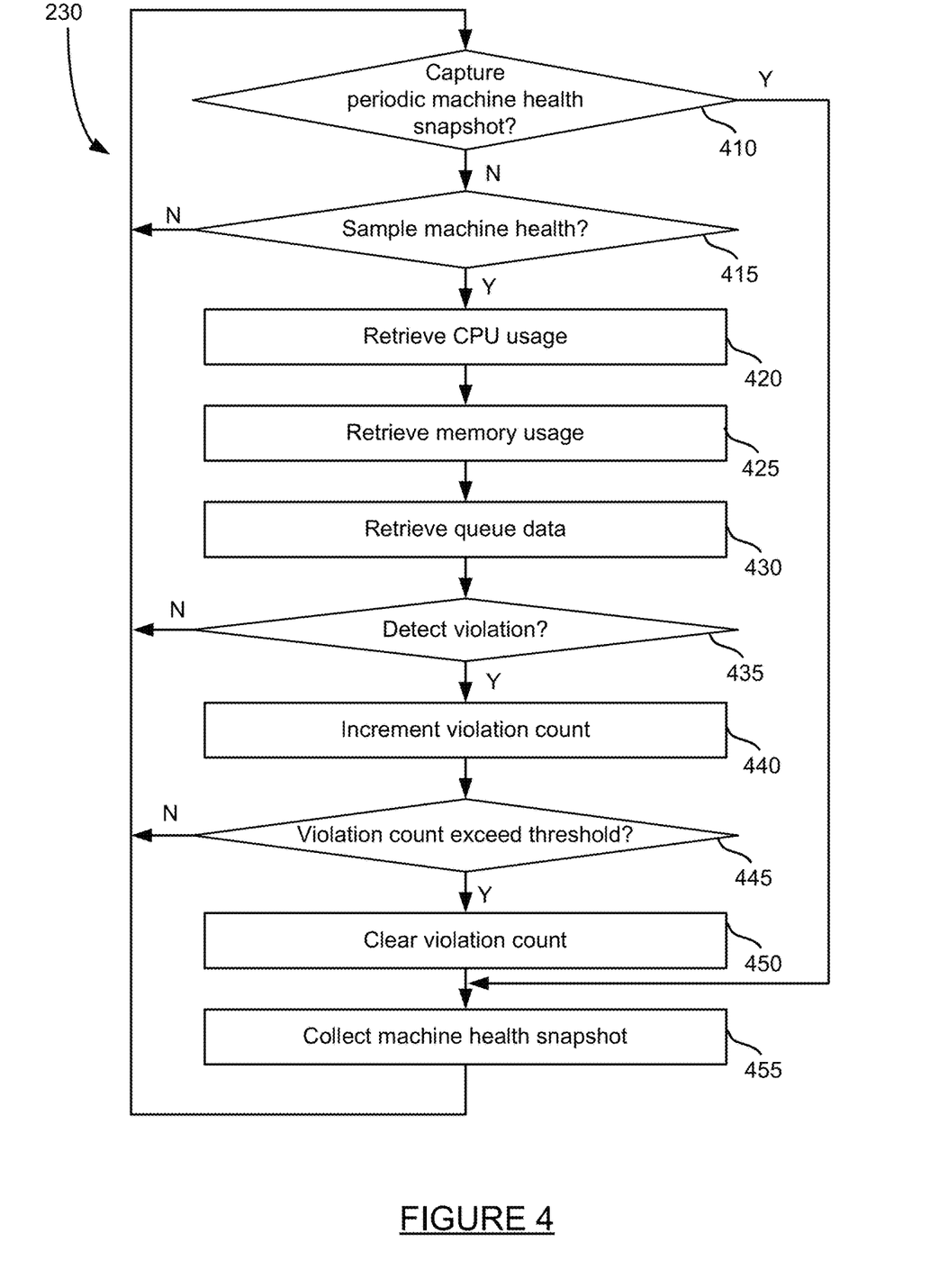
FIG. 4 is a method for collecting machine health data.

FIG. 4 illustrates a method for collecting machine health data. The method of FIG. 4 provides more detail for step 230 of the method of FIG. 2. First, a determination is made at step 410 as to whether a periodic machine health snapshot should be captured. Period machines snapshots are captured after a period of time has transpired. If a periodic machine health snapshot should be captured, the method of FIG. 4 continues to step 455 where the machine health snapshot is captured. If it is not currently time to capture a periodic machine health snapshot, the method of FIG. 4 continues to step 415.

A determination is made as to whether machine health for the current machine should be sampled at step 415. In some instances, a machine health snapshot is captured and stored. Determining whether to capture a machine health snapshot may be done periodically or based on policy rules. The policy rules may include sampling the machine health and determining if the machine health samples indicate the machine health snapshot should be taken. If the machine health snapshot should be taken at step 415, the CPU usage is retrieved at step 420. The CPU usage may be retrieved by an agent through an API of the operating system of the machine on which the agent is stored. Memory usage may be retrieved at step 425. The memory usage may also be retrieved through an interface or API provided by an operating system of the machine. Queue data may be retrieved at step 430. The queue data is retrieved to determine the latency associated with a particular queue. The latency for a particular queue may be based on the number of requests currently in the queue, the length of time a request has been in the queue, and other metrics associated with the queue.

Once the CPU usage, memory usage, and queue data is retrieved, a determination may be made as to whether a violation is detected at step 435. A violation may be detected for each machine component sampled. A violation may be detected for CPU usage if the usage is above a particular usage threshold. The memory usage may be in violation if the current usage is above a particular memory usage threshold. The queue data may be in violation if a request exists in the queue that has been in the queue for greater than a threshold time period. If a violation is not detected, the method of FIG. 4 returns to step 410. If a violation is detected, a violation count may be incremented at step 440. In some embodiments, a separate violation count is maintained for each machine resource separately. In some instances, a single violation count may be maintained for all of the resources collectively.

A determination is made as to whether the violation count exceeds a threshold at step 445. In some instances, the determination for the violation count is made for each resource individually. Thus, if the memory usage violation count has exceeded a threshold but the CPU usage violation count has not exceeded its corresponding threshold, the determination at step 445 would be in the affirmative based on the memory usage violation. If no violation count has been detected to exceed a threshold, the method of FIG. 4 returns to step 410.

If a particular violation count has exceeded a threshold, the violation count is cleared and a machine health snapshot is collected at step 455. A machine health snapshot may include the current CPU usage, memory usage, and queue data. In some embodiments, at step 450, every violation count is cleared at step 450. In some instances, only the violation count that exceeds the threshold is cleared. After collecting the machine health snapshot at step 455, the method of FIG. 4 returns to step 410.

Figure 5:
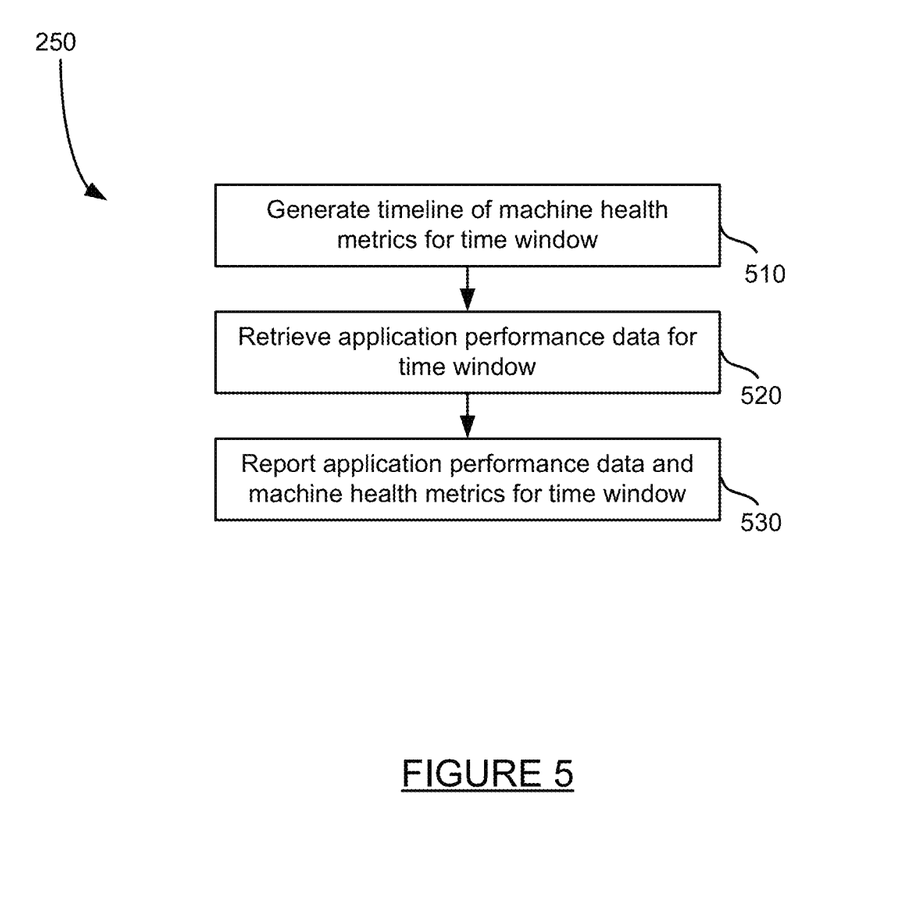
FIG. 5 is a method for reporting a correlation between application performance data and machine health data.

FIG. 5 is a method for reporting correlation between application performance and machine health data. The method of FIG. 5 provides more detail for step 250 of the method of FIG. 2. First, a timeline of machine health metrics may be generated for a particular time window at step 510. Application performance data may then be retrieved for the time window at step 520. The application performance data and machine health metrics may then be reported for that particular time window at step 530.

Figure 6A:
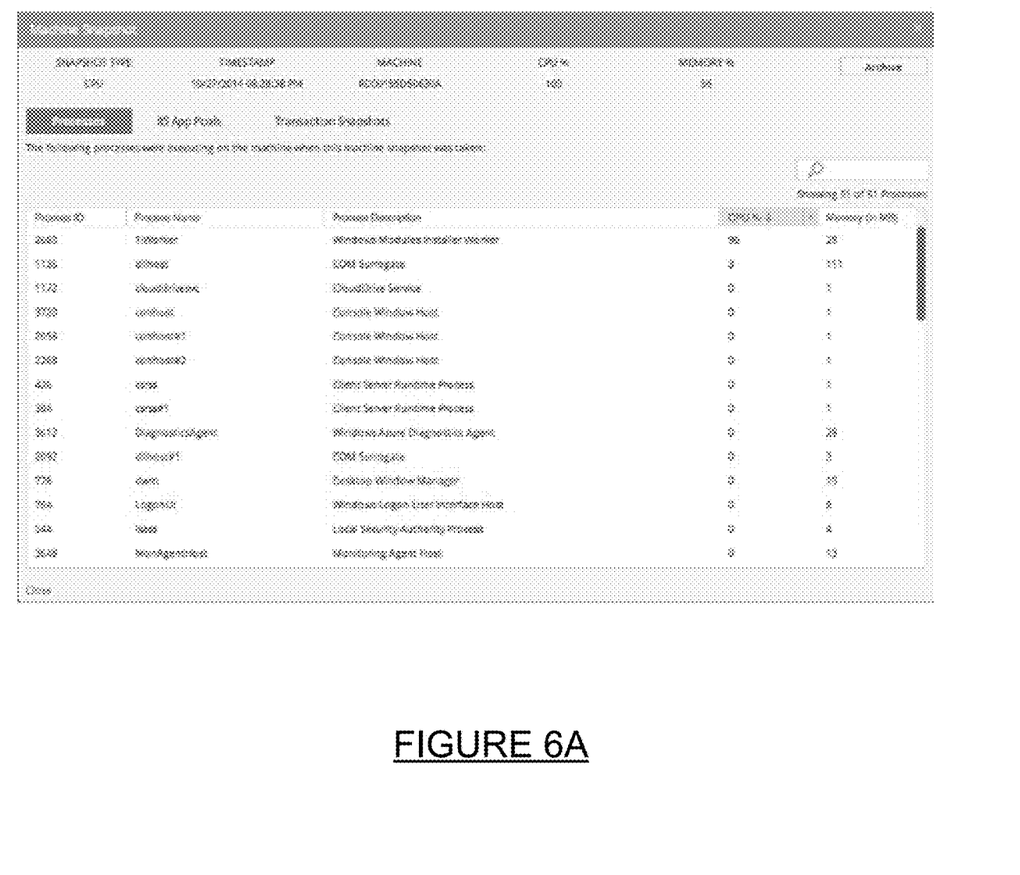
FIGS. 6A and 6B illustrate screen shots of a report of correlated application performance data and machine health data.
Figure 6B:
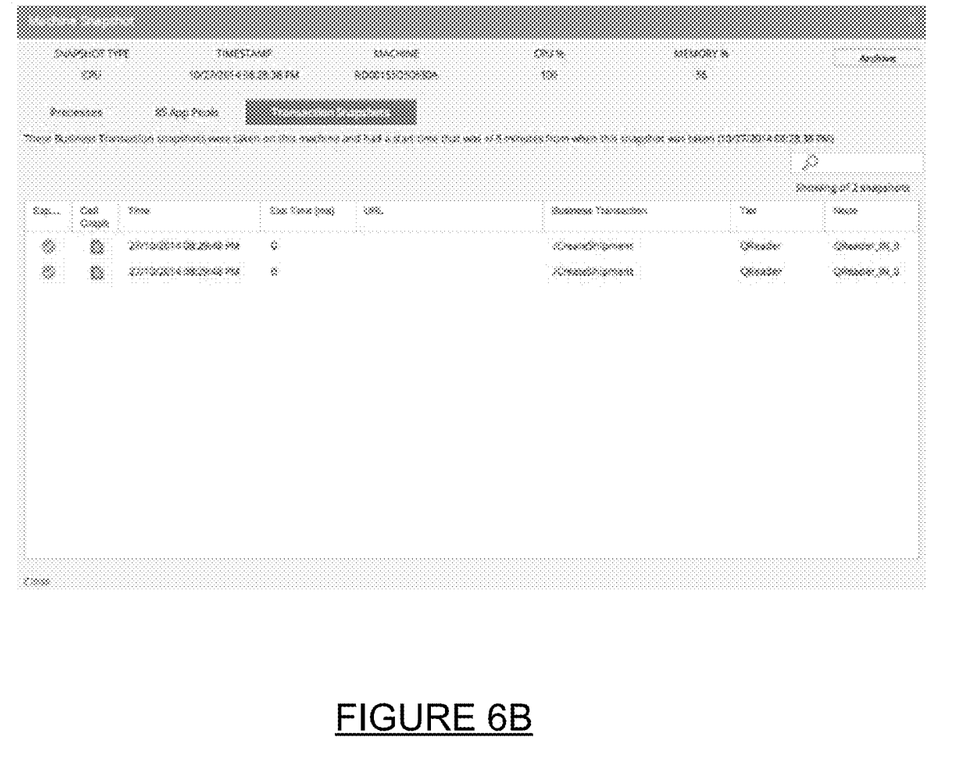
Figure 7:
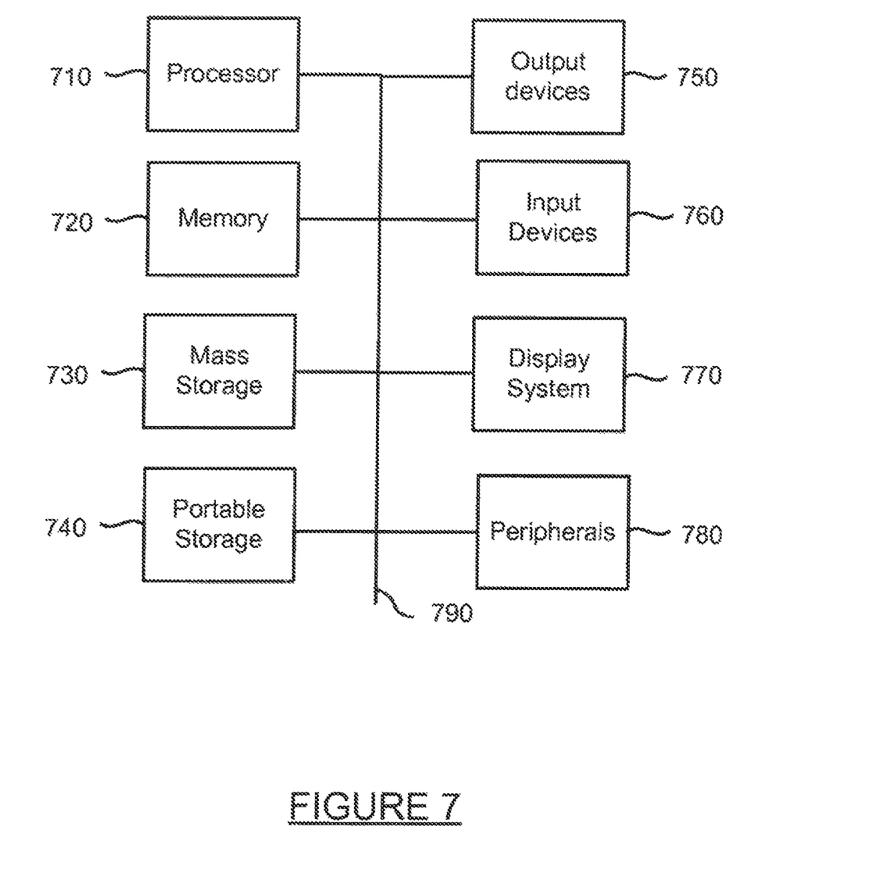
FIG. 7 is a block diagram of a computing environment for implement the present technology.

FIGS. 6A and 6B illustrate interfaces for reporting application performance data and machine health metrics. FIG. 6A illustrates a number of computer processes that were executing on a CPU at the time of a snapshot. As shown, one process of the running processes is indicated as using 96% of the CPU usage at the time of the machine snapshot. FIG. 6B illustrates business transaction snapshots at the time of the snapshot. The business transaction snapshots are captured at plus or minus five minutes from the time of the snapshot. The performance of the snapshots can be compared to the CPU usage at the particular time.

FIG. 5 is a block diagram of a computing environment for implementing the present technology. System 500 of FIG. 5 may be implemented in the contexts of the likes of clients 105 and 192, network server 125, application servers 130-160, controller 190, and data stores 180-185. A system similar to that in FIG. 5 may be used to implement mobile device 115, but may include additional components such as an antenna, additional microphones, and other components typically found in mobile devices such as a smart phone or tablet computer.

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include an LED, liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring an application, comprising:
   receiving, at a controller device in a computer network from an agent installed on a remote machine, performance data of an application that performs a portion of a distributed business transaction, wherein the application is hosted on the remote machine, further wherein the performance data is indicative of performance of the distributed business transaction;
   receiving, at the controller device from the agent, machine health data for the remote machine;
   analyzing, by the controller device, the machine health data to determine whether a machine health violation is detected;
   determining, by the controller device, whether a count of the machine health violation detected exceeds or satisfies a threshold;
   in response to determining that the count has exceeded the threshold, initiating, by the controller device, a machine health snapshot of at least CPU data, memory data and queue data;
   correlating, by the controller device, the performance data and the machine health data for a period of time; and
   reporting, by the controller device, the correlation of the performance data and machine health data for the period of time.

2. The method of claim 1, wherein the machine health data includes the CPU data, the memory data, or the queue data.

3. The method of claim 1, wherein analyzing the machine health data includes comparing against a maximum threshold for each type of the machine health data.

4. The method of claim 1, wherein determining whether the count exceeds or satisfies a threshold includes determining whether the count exceeds or satisfies a maximum number of allowed violations.

5. The method of claim 4, wherein the machine health snapshot is collected and stored when the maximum number of allowed violations is exceeded.

6. The method of claim 1, further comprising:
providing a graphical display with the correlated machine health data and application performance data.

7. The method of claim 6, wherein providing the graphical display includes:
displaying for a particular time window a timeline of machine health metrics generated from the machine health snapshot; and
retrieving the correlated application performance data for the time window.

8. A non-transitory computer readable storage medium having embodied thereon a program, the program being executable by a processor on a controller device in a computer network to perform operations for monitoring an application, the operations comprising:
receiving, at the processor from an agent installed on a remote machine, performance data of an application that performs a portion of a distributed business transaction, wherein the application is hosted on the remote machine, further wherein the performance data is indicative of performance of the distributed business transaction;
receiving, at the processor from the agent, machine health data for the remote machine;
analyzing, by the processor, the machine health data to determine whether a machine health violation is detected;
determining, by the processor, whether a count of the machine health violation detected exceeds or satisfies a threshold;
in response to determining that the count has exceeded the threshold, initiating, at the processor, a machine health snapshot of at least CPU data, memory data and queue data;
correlating, by the processor, the performance data and the machine health data for a period of time; and
reporting, by the processor, the correlation of the performance data and machine health data for the period of time.

9. The non-transitory computer readable storage medium of claim 8, wherein the machine health data includes the CPU data, the memory data, or the queue data.

10. The non-transitory computer readable storage medium of claim 8, wherein analyzing the received machine health data includes comparing against a maximum threshold for each type of the machine health data.

11. The non-transitory computer readable storage medium of claim 10, wherein determining whether the count exceeds or satisfies a threshold includes determining whether the count exceeds or satisfies a maximum number of allowed violations.

12. The non-transitory computer readable storage medium of claim 8, further comprising:
providing a graphical display with the correlated machine health data and application performance data.

13. A controller device for monitoring an application, comprising:
a processor;
a memory; and
one or more modules stored in the memory and executable by the processor to perform operations comprising:
receive, at the controller from an agent installed on a remote machine, performance data of an application that performs a portion of a distributed business transaction, wherein the application is hosted on the remote machine, further wherein the performance data is indicative of performance of the distributed business transaction;
receive, at the controller from the agent, machine health data for the remote machine;
analyze, by the controller device, the machine health data to determine whether a machine health violation is detected;
determine, by the controller device, whether a count of the machine health violation detected exceeds or satisfies a threshold;
in response to a determination that the count has exceeded the threshold, initiate, by the controller device, a machine health snapshot of at least CPU data, memory data and queue data;
correlate, by the controller device, the performance data and the machine health data for a period of time; and
report, by the controller device, the correlation of the performance data and machine health data for the period of time.

14. The controller device of claim 13, wherein the machine health data includes the CPU data, the memory data, or the queue data.

15. The controller device of claim 13, wherein to analyze the machine health data includes comparing against a maximum threshold for each type of the machine health data.

16. The controller device of claim 13, wherein to determine whether the count exceeds or satisfies a threshold includes determining whether the count exceeds or satisfies a maximum number of allowed violations.

17. The controller device of claim 16, wherein the one or more modules are executable to store the machine health snapshot when the maximum number of allowed violations is exceeded.

18. The controller device of claim 13, wherein the one or more modules are executable to perform operations further comprising:
provide a graphical display with the correlated machine health data and application performance data.

19. The controller device of claim 18, wherein to provide the graphical display includes:
display for a particular time window a timeline of machine health metrics generated from the machine health snapshot; and
retrieve the correlated application performance data for the time window.

* * * * *